United States Patent [19]
Abraham et al.

[11] Patent Number: 6,091,499
[45] Date of Patent: Jul. 18, 2000

[54] METHOD AND DEVICE FOR AUTOMATIC RELATIVE ADJUSTMENT OF SAMPLES IN RELATION TO AN ELLIPSOMETER

[75] Inventors: Michael Abraham, Mainz; Oliver Depner, Saulheim; Matthias Eberhardt, Lorzweiler, all of Germany

[73] Assignee: NanoPhotonics AG, Germany

[21] Appl. No.: 09/291,119

[22] Filed: Apr. 14, 1999

[30]    Foreign Application Priority Data

Apr. 17, 1998 [DE]  Germany .......................... 198 16 974
Aug. 26, 1998 [DE]  Germany ...................... 298 15 297 U

[51] Int. Cl.⁷ ................................ G01B 11/14; G01J 4/00
[52] U.S. Cl. ............................................ 356/375; 356/369
[58] Field of Search ..................... 356/375, 376, 356/369, 399–401

[56]               References Cited

U.S. PATENT DOCUMENTS 3,880,524  4/1975  Dill et al. ................................. 356/369
4,558,949  12/1985  Uehara et al. .......................... 356/375
4,589,773  5/1986  Ido et al. ................................. 356/371

FOREIGN PATENT DOCUMENTS 2430521  1/1975  Germany .

*Primary Examiner*—Hoa Q. Pham
*Attorney, Agent, or Firm*—Hudak & Shunk Co., L.P.A.

[57]               ABSTRACT

Normally, repeated calibration measurements are necessary for the adjustment of the sample and ellipsometer. To achieve an automatic relative adjustment, a sample position detection system that can be adjusted in relation to the ellipsometer and locked in is assigned to the ellipsometer, and where the detection system is connected to an adjusting system that affects the sample table and/or the entire system detection system/ellipsometer. The method for automatic relative adjustment is provided for, that by initially using one sample, the system sample/ellipsometer is adjusted via the symmetry of the detector signal of the ellipsometer, and that the sample position detection system is adjusted and subsequently locked in with the ellipsometer. With all subsequent samples, a relative adjustment of sample and ellipsometer detection system is performed using the signals of the detection system. In particular, the measurements can be performed without moving the sample itself because the adjustment can also be carried out through a single movement of the ellipsometer detection system.

7 Claims, 3 Drawing Sheets

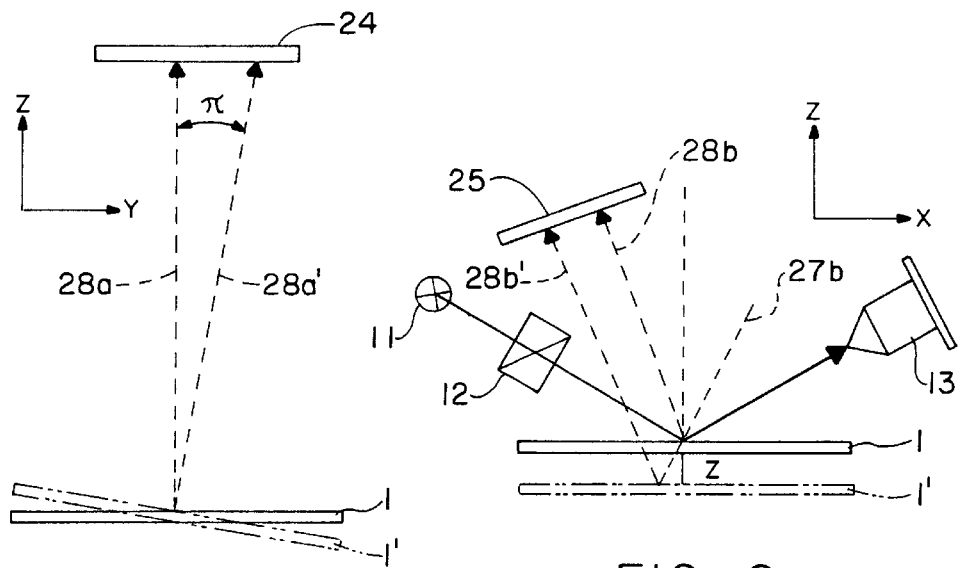
FIG.-2b
FIG.-2c
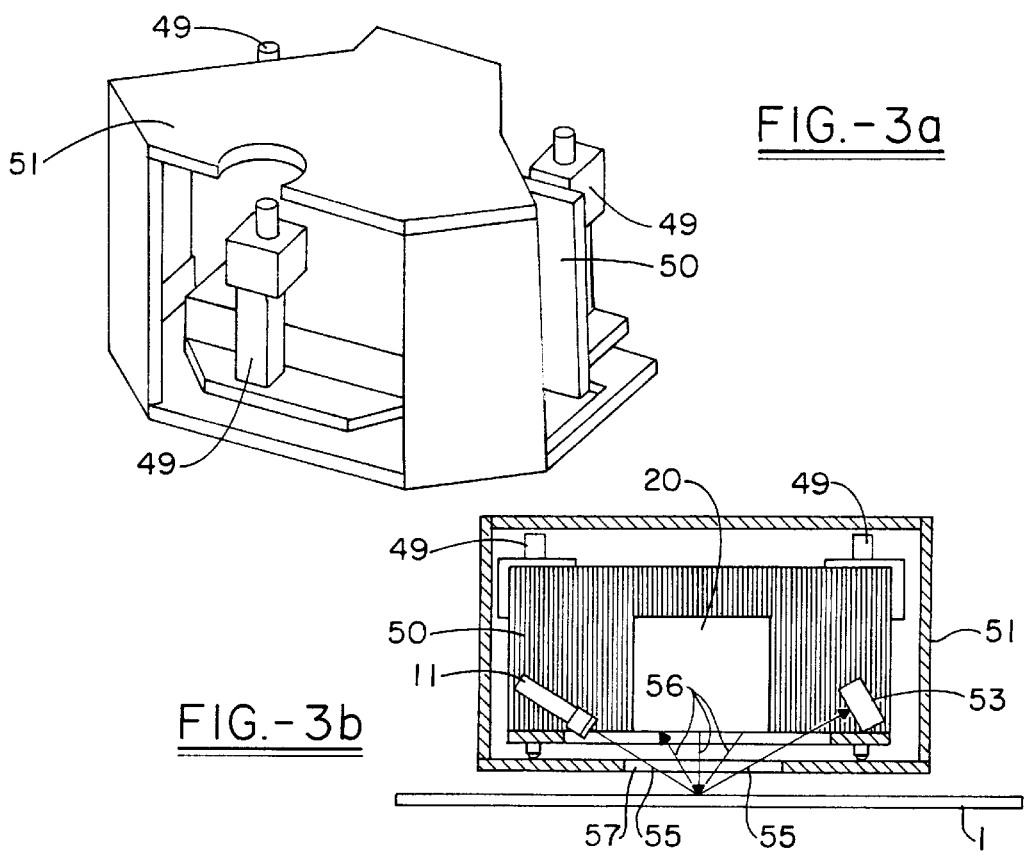
FIG.-3a
FIG.-3b

METHOD AND DEVICE FOR AUTOMATIC RELATIVE ADJUSTMENT OF SAMPLES IN RELATION TO AN ELLIPSOMETER

BACKGROUND OF THE INVENTION

Field of the Invention

The invention relates to a device for the automatic relative adjustment of a sample that is positioned on a sample table in relation to an ellipsometer that is analyzing the sample's surface, where the sample position detection system is adjustable in relation to the ellipsometer and is connected to an adjusting device that is assigned to the ellipsometer. The invention also relates to a method for relative adjustment of the sample in relation to the ellipsometer. In addition, the invention relates to a device for detecting the position of a sample to be analyzed relative to a detection system.

Ellipsometry is a sensitive optical method to determine the refractive index and the thickness of very thin film. It utilizes the changes in the polarization state of light after reflection on the sample surface. Collimated and completely polarized light is directed to the sample at a certain angle of incidence. After the reflection, the polarization state of the light beam changes as a function of the sample properties. For example, a linearly polarized incident light is reflected elliptically polarized after interaction with the sample. The polarization changes are detected using suitable configurations of optical polarization components in the path of the beam of the ellipsometer. It is usually described using ellipsometric parameters that in turn allow the calculation of sample properties such as thickness and the refractive index of the films with the assistance of mathematical algorithms.

An often-used configuration of photometric ellipsometers consists of a source for collimated light, a polarizer, the sample, an analyzer and a detector. A periodic signal from which the ellipsometric parameters are derived results at the detector by rotating either the analyzer or the polarizer. An extensive description of ellipsometry can be found in R. M. Azzam, Bashara, Ellipsometry and Polarized Light, North Holland, Amsterdam, 1988.

The reference system of ellipsometry is the plane of incidence (x-z plane in the selected coordinate system of the ellipsometer) of the beam. It is created by the axis of the incident collimated light and the plumb on the area element of the sample that the light beam strikes. The angle between the plumb of the axis of the incident beam is called the angle of incidence. All optical polarization components of the ellipsometer are aligned with this reference system. The angle of incidence and the angle position of the components of the ellipsometer in relation to the plane of incidence enter directly into the calculations of the sample properties. These parameters must be known accurately (better than 0.01°) to actually attain the intrinsic accuracy of the instrument. They are either predefined by the design or are entered using a goniometer, where the optical components are arranged. Often, these measures are not adequate making subsequent calibration measurements with known samples necessary.

With ellipsometry, it is possible to measure refractive indexes to an accuracy of 0.01% and coating thicknesses with accuracy in the sub-nm range. A crucial prerequisite for actually reaching the accuracy theoretically possible with ellipsometry is a correct adjustment of the instrument with regard to the sample. Erroneous adjustments can occur, for example, due to operational errors or due to long-term drifts of the mechanical instrument structure. However, small erroneous adjustments are not easily detectable. Thus, the inherent risk exists that they are transferred to the measurement results as systematic errors.

For practical applications, particularly in continuous quality control for the manufacture of thin film, it is crucial to ensure a perfect adjustment of the ellipsometer with regard to the sample even with frequent changes of the sample and over long periods. It is only in this manner that ellipsometry can fully utilize its potential even at high sample throughput.

According to the current state-of-the-art, the assurance of a correct adjustment is only possible using extensive calibration measurements with completely characterized samples. This can only be accomplished with random sampling by an operator.

One solution is the use of a position-sensitive detector in the analyzer arm of a photometric ellipsometer such as was suggested in EP 0 632 256 A1 and U.S. Pat. No. 5,502,567. The circular symmetry of the detector array present in this device in combination with inserted micro-optics supplies a signal that reacts very sensitively to both a tilting of and the distance from the sample. A transparent cone that is directly mounted to a circular array of an even number of identical photo detectors (cone polarimeter) has proven particularly effective. A strictly symmetrical sinus-shaped signal is obtained with correct adjustment of the sample/ellipsometer system, such as the one obtained with a photometric ellipsometer with a rotating polarizer. Thus, the cone polarimeter constitutes an intrinsic reference system of the ellipsometer. A disadvantage is, however, that the responses of the cone polarimeter to changes in the position of the sample are very complex and not linear. The effects of tilting and linear shifts on the signal are not independent of one another, such that the three degrees of freedom cannot be separated out of one single signal. This is particularly true for very strong deviations from the ideal position. Because of this, it is difficult to achieve a control system for automation. The cone polarimeter points to the goal but does not lead the way there.

An additional disadvantage is that with slight misadjustments of the measurement system, whether because of a thermal drift of the ellipsometer/sample system, mechanical influences or even due to an electronic drift, the running measurement must be interrupted to adjust the system using calibration measurements. This is time-consuming and requires qualified operating personnel.

A device, where the readjustment procedure is partially automated is described in the disclosure DE 24 30 521 A1. This device is an arrangement for ellipsometric measurements that is equipped with an automatic adjusting device. The adjusting device operates according to the premise that with a defined spatial incidence angle (defined by an aperture in the beam path of the ellipsometer) the reflected beam to analyzed must be at a defined spatial angle (captured by the detector). With a fixed measurement geometry, the angles which are orthogonal to one another, and which are between the sample surface and plane of the beam as well as between sample surface and the beam itself, are adjusted.

The device to determine the beam deviation consists of four light-sensitive elements, including fiber-optic cables, that are each located in one quadrant, and of a central aperture that defines the emergent spatial angle. With this method, elements located opposite of each other serve the purpose of detecting a deviation of the angle and, by the fact that each pair is connected to a control motor, also the automatic correction of the deviation of the angle. The sample orientation will be changed as long as the intensity distribution at opposing quadrants is not symmetrical.

Thus, this device is only capable of detecting a tilting of the sample, but not a deviation in the height of the sample position. The fact that with this device the height adjustment can only be carried out by hand implies a higher measurement uncertainty and a disproportionately high expenditure if a larger number of samples is to be measured. Furthermore, the detection system and the ellipsometer are not decoupled but have a common beam path. Thus, the alignment of the ellipsometer and detection system to one another is fixed. By coupling both systems, the absolute deviations of the sample positions are always measured from the source of the coordinate system. This leads to fixed positions of the ellipsometer and detection system and an adjustment of the sample can be carried out only via a change in the sample position.

Conventional ellipsometer devices have in common, that the adjustment of the ellipsometer is always carried out via the sample table. For example, if the three reference points on the sample are used, and each reference point has its sensor, then the measurement point must be adjusted according to these three reference points. This works only with flat samples. This system will fail with arched samples. Especially very large samples (large wafers or flat screens) require significant effort. Large wafers with a diameter of 300 mm already have curvatures due to their own weight. Oftentimes, samples are distorted due to mechanical stress after a coating is applied. This would falsify a measurement because during scanning of the sample surface the set sample alignment would not remain. For this reason, the sample tables are equipped with an evacuation device. It vacuum-draws the sample an is pressed flat to the sample table.

This method is expensive and often disadvantageous with sensitive samples. Since such sample tables are not used for transporting the samples during manufacture, the sample must be removed from the production process for measurement, must then be transported to the ellipsometer and returned after the measurement. This often allows only for random sampling. Wafers used in the micro-system technology cannot be measured with such devices because the thin membranes would be destroyed during the evacuation phase.

SUMMARY OF THE INVENTION

The object of this invention is a device that enables an automatic relative adjustment of the sample and ellipsometer without the need for repeated calibration measurements. The invention also refers to a corresponding method and a device to recognize the sample position.

The task is solved with a device that is characterized in that the sample position detection system can be locked with regard to the ellipsometer, that the detection system for measuring the distance of the sample from the coordinate source of the ellipsometer, and to measure the tilt of the sample is designed in two perpendicular axes, and that the adjusting device affects the sample table and/or the entire system-detection system/ellipsometer.

A preferred embodiment of the sample position detection system features a light source and optical elements that are used to direct two beams onto the surface of the sample. In addition, the detection system comprises two detectors that capture the reflected light from the sample surface, where a first position-sensitive detector is provided for the detection of the sample tilt and a second position-sensitive detector is provided for the detection of the sample distance.

Two detectors are not mandatory. For example, one position-sensitive detector is sufficient to detect the tilt, while a misadjustment in the z-direction may be detected via signal structure analysis of the polarimeter signal.

Other sensor arrangements that can be used to determine the position of the ellipsometer are possible.

It is important in this context that the adjustment is made for only one measurement point. Thus, even curved substrates or substrates with an inconsistent thickness can be measured. That is to say, that the system detects if the measurement point migrates from the optimum position and makes adjustments until the measurement point originally intended by the system is again established.

The sample position detection system supplies signals that are clearly assigned to each degree of freedom, such that an adjustment of the adjusting device is possible based on this control parameter. The coordinate system of the sample position detection system is adjusted and locked to the coordinate system of the ellipsometer, where locking is preferably understood as an electronic procedure. This is accomplished in that, after adjusting the sample position detection system and ellipsometer, each respective position of the light beams, preferably laser beams, striking the position-sensitive detectors is retained electronically, for example in a control unit, as reference position.

Should the sample position change during routine operation, the deviation is detected through the changed striking positions of the light beams on the detectors. This in turn generates control signals that are used to control the adjusting device.

With regard to the sample, the adjusting device can either change the sample position or the position of the entire adjusted system ellipsometer/sample position detection system. The adjustment of both the sample table and of the entire system is possible but due to the significantly higher technical expenditure not preferable versus the alternatives mentioned above.

Preferably, the adjusting device features at least one translation actuator and two pivot actuators such that a longitudinal adjustment of the sample table and/or of the entire system ellipsometer/sample position detection system is possible in the desired degree of freedom.

According to another embodiment, the ellipsometer can additionally be connected to a signal analysis unit that is linked to the adjusting device. This signal analysis unit is used for, among other things, the so-called dynamic correction that is explained in connection with the method claims.

In addition, this signal analysis unit may be used to detect a z-misadjustment as described above.

In the device subject to the invention, the sample position detection system assumes the role of the autocollimation telescope known from the present state-of-the-art, and the position-sensitive channel of the ellipsometer that of the calibration measurement. In this manner, the ideal adjustment condition can be checked automatically at any time without the need for elaborate calibration measurements carried out by the operating personnel. Thus, the ability to repeat a very high number of precise measurements is guaranteed over long periods and under changing external conditions.

In a preferred embodiment, the adjusting device of the measurement device affects the entire system comprised of detection system and ellipsometer while the sample itself is not moved. For this purpose, the entire device is integrated in a small measuring head. This has indisputable advantages when the device is used in quality control during the production of large samples such as wafers or flat screens.

Since the adjustment of the system ellipsometer/sample is carried out via the ellipsometer, the device can be integrated in the process environment at hand without the necessity for an additional elaborate sample table. For example, the usually present robots can hold the sample under the ellipsometer for a short time. The mechanical accuracy of the robots, which is inadequate for ellipsometric measurements, is corrected both in angle and in distance by the auto-adjustment system integrated in the measuring head. A potential distortion of the sample is corrected by this adjustment as well. The processing times are reduced and a one hundred percent quality control is possible because the samples remain in the flow of the production. Because the measurement is integrated in the process, process deviations are recognized quicker and the yield is increased. Not least, integrating the device into the production environment is without a problem due to the extreme smallness of the instrument.

The process is characterized in that initially using a first sample (calibration sample) the system sample/ellipsometer is adjusted via the symmetry of the detector signal of the ellipsometer. Then, the sample position detection system, which detects the sample distance from the coordinate source of the ellipsometer and the tilt of the sample in two perpendicular axes, is adjusted with regard to the ellipsometer and is locked with the ellipsometer after the adjustment. With all subsequent samples, a relative adjustment of sample and ellipsometer/detection system is carried out based on the signals of the detection system.

Preferably, the symmetry of the ellipsometer signal is monitored continuously and a readjustment is carried out if a deviation from the symmetry of the ellipsometer is detected. This is the so-called dynamic correction, which is based on a fully adjusted ellipsometer system. During the operation of the device, small misadjustments of the system can occur, caused, for example, by thermally triggered drifts of the mechanics, by mechanical influences or even by a drift of the electronic system of the sample position detection system. Thus, the sample position detection system may bring the ellipsometer into a position where the ellipsometer signal no longer shows the required symmetry. For this reason, the method subject to the invention provides a permanent self-test where the symmetry of the signal is monitored continuously using the signal analysis unit. If a misadjustment occurs due to the drifts mentioned above, the (electronic) lock-in of the sample position detection system is canceled and the ellipsometer is returned to the correct position using the adjusting device. Thereafter, the sample position detection system is locked in the new position.

Through this dynamic correction, the device subject to the invention is entirely independent of an external calibration measurement such as is necessary in applications with instruments according to the current state-of-the-art. Thus, an interruption of the measurement process to insert a calibration sample and perform the required measurement is not necessary. The entire system is self-calibrating and special calibration samples are not necessary. This improves the process security and ensures the ability to repeat a high number of precise measurements.

The invention enables a quick adjustment unit that is independent of the sample material and operates in a linear fashion with automatic detection of misadjustment conditions during the normal measurement operation of the ellipsometer. Detection with a linear response is easier to handle and is quicker than a non-linear one. The invention has particular significance in the area of process control, e.g., in the semiconductor industry. Here, coating thicknesses of a few nm are measured. Even a small misadjustment of the ellipsometer/sample system can lead to significant systematic measurement errors. The invention aids in automatically and quickly detecting and correcting rough systematic errors. Thus, the operator has a more reliable system than previously when he had to rely on continuous reference measurements to determine the condition of his instrument.

The device to detect the position of a sample to be analyzed relative to a detection system is characterized in that one light source and optical elements are provided which can be used to guide two beams to the surface of the sample as well as two position-sensitive detectors that capture the light which is reflected from the sample surface, where a first detector is provided for the detection of the sample tilt and a second detector is provided for the detection the sample distance. This device can be used for any spectroscopic measurement.

BRIEF DESCRIPTION OF THE DRAWINGS

Additional details and features of the invention will become more readily apparent from the following description of an exemplary embodiment with reference being made to the accompanying drawings, wherein

FIGS. 2a–c illustrate the potential position changes of the sample and the effects on the sample position detection system;

FIGS. 3a–c show in perspective and in two sections a device integrated in the measuring head.

DETAILED DESCRIPTION OF THE INVENTION

Figure 1:
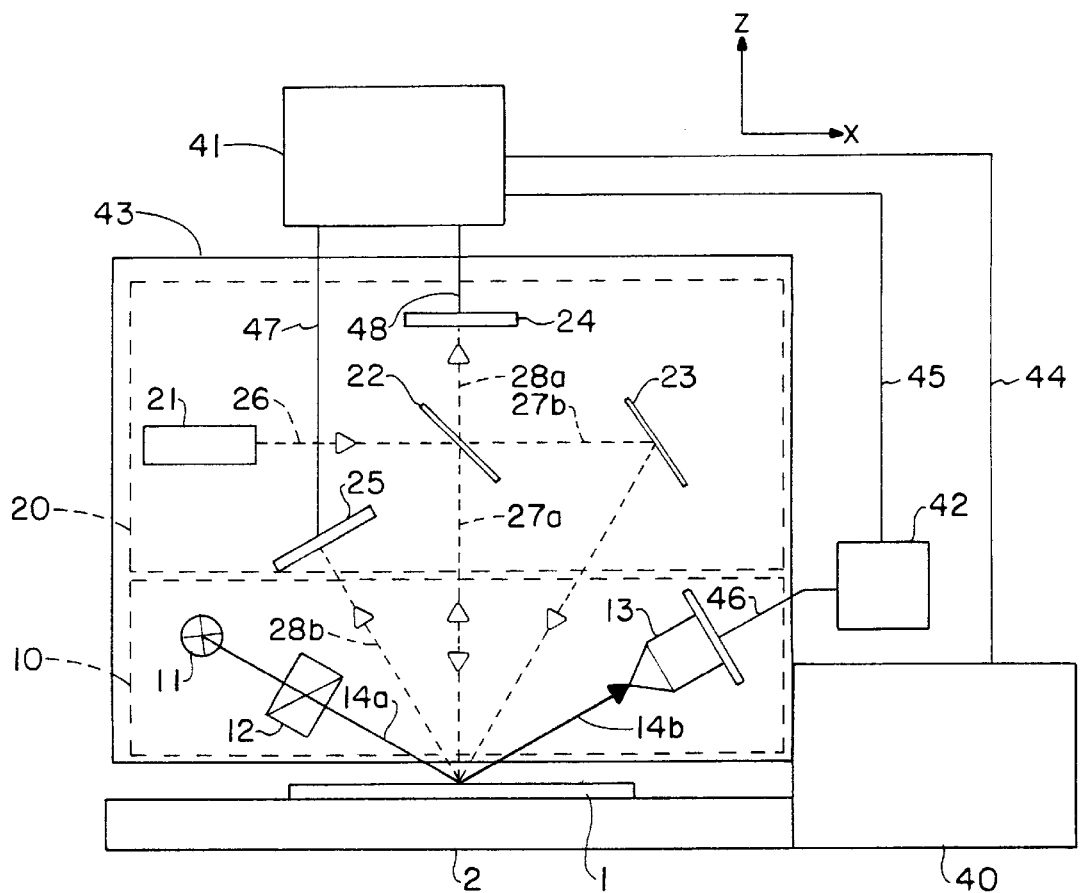
FIG. 1 is a schematic illustration of the device.

FIG. 1 is a schematic illustration of the device subject to the invention. A sample 1 is positioned on a sample table 2 above which the ellipsometer 10 for the analysis of the surface conditions of sample 1 is positioned. The ellipsometer 10 is comprised of a light source 11, a polarizer 12 and a cone polarimeter 13. The light emitted from the light source 11 (incident beam 14a) is polarized by the polarizer 12 and strikes the sample surface where it is reflected. The reflected light beam 14b strikes the polarimeter 13, which is connected to a evaluation device (not further shown in this illustration), where the evaluation of the detected reflected light beam 14b is carried out.

A sample position detection system 20 that incorporates a laser 21 is located above the ellipsometer 10. The light beam 26 emitted by the laser 21 is deflected by the semitransparent mirror 22 vertically downwards to the sample 1 (light beam 27a). A portion of the light beam 26 strikes the deflecting mirror 23, which directs the light beam 27b to the sample 1 as well. The two reflected beams 28a and 28b strike the position-sensitive detectors 24 and 25 that are connected to the control unit 41 via signal lines 47, 48. Via a control lead 44, the respective signals are passed on to an adjusting device 40, which links the sample table 2 with the entire system 43.

Figure 2A:
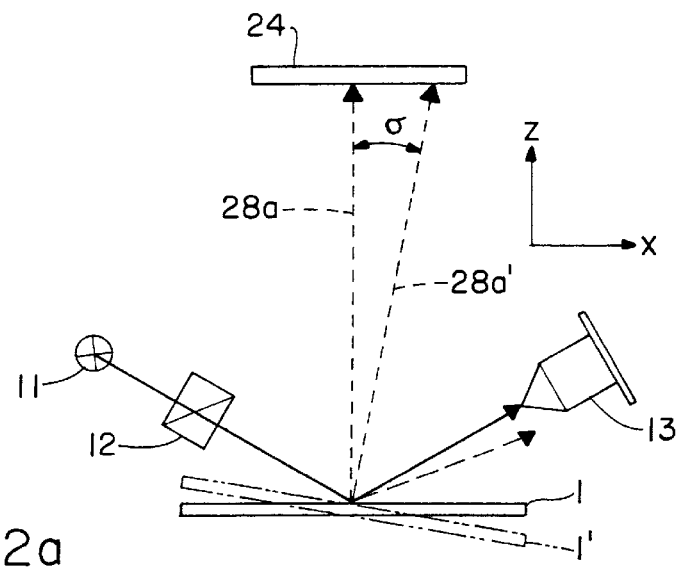

If the position of the sample changes from the position shown in FIG. 1, as illustrated in FIGS. 2a–c, beams 28a, 28b are reflected under different angles, which is detected by the corresponding detectors 24 and 25. FIG. 2a shows the sample 1 in a tilted position (sample 1') such that the reflected beam 28a is reflected back at an angle . The reflected beam 28a', thus, strikes the detector 24 at a different place and the detector recognizes this. The sample 1' can be returned to its original position 1 using the adjusting device 40. The other possibility is to readjust the entire system 43 consisting of sample position detection system 20 and ellipsometer 10, such that the reflected beam 28a' assumes the position of the original beam 28a.

FIG. 2b illustrates a tilt in a direction perpendicular to the tilt shown in FIG. 2a. Here, the change in the sample position causes a change in the strike point of reflected beam 28a or 28a' as well.

FIG. 2c illustrates a parallel shift of sample 1, 1' in the direction of the z-axis. The strike point of the incident beam 27b is shifted due to the change in position, which leads to a parallel shift of beam 28b to beam 28b'. Detector 25 detects this change in position. Here too, the adjusting device 40 provides the respective readjustment.

In FIG. 1, the entire system 43 is additionally connected via signal line 45 to a signal analysis device 42 that continuously monitors the symmetry of the polarimeter signal. Via a signal line 45, the control device 41 and the control line 44, this signal analysis device 42 is also connected to the adjusting device 40. If there is a deviation from the required symmetry, the (electronic) lock-in of the sample position detection system is canceled and the entire system 43 is returned to the correct position using the adjusting device 40.

Figure 3C:
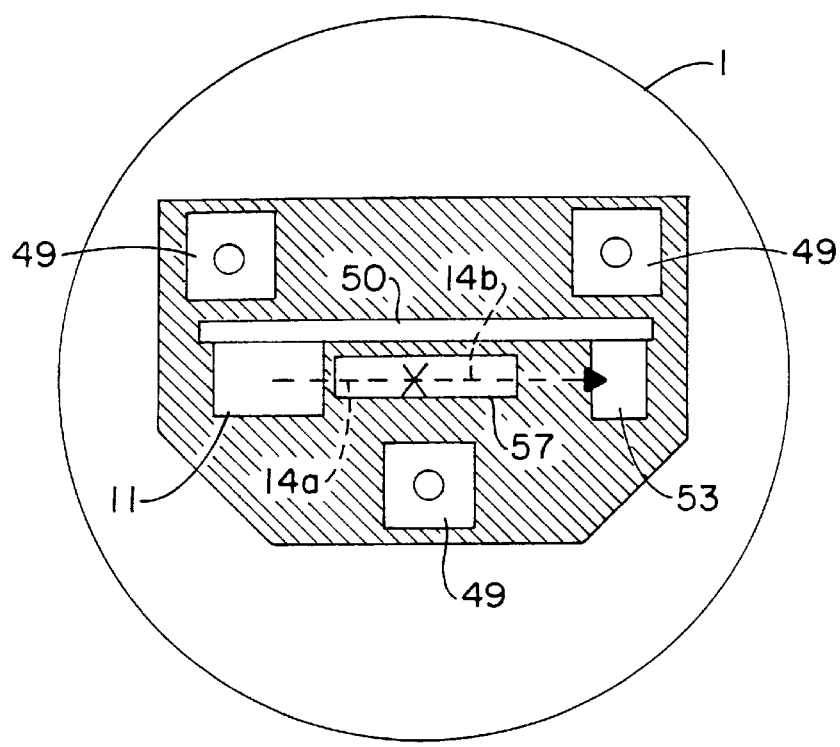

FIGS. 3a–c illustrate an embodiment where the device is integrated in a small measuring head. FIG. 3a shows a perspective presentation, FIG. 3b a section perpendicular to the sample and FIG. 3c a section parallel to the sample.

FIG. 3a illustrates how the three step motors are arranged relative to the frame 51 of the measuring head and to the ellipsometer base plate 50. The actual measurement device is attached to the ellipsometer base plate. It is adjusted in relation to the sample using the step motors 49.

FIG. 3b shows a section through the measuring head perpendicular to the sample surface. The step motors 49 that move the ellipsometer base plate 50 are positioned within frame 51. The sample position detection system 20 and the light source 11 of the ellipsometer and a detector 53 are attached to the ellipsometer base plate 50. The measurement beams 55 and the sensor beams 56 of the sample position detection system pass through the slot 57. The sample position detection system 20 detects a potential deviation of the ellipsometer system from the ideal measurement position via the sensor beams 56 and initiates an adjustment of the ellipsometer base plate 50 via step motors 49 to return the ellipsometer system to the correct position relative to sample 1.

FIG. 3c illustrates a section through the measuring head parallel to sample 1. The light source 11 and the detector 53 are attached to the ellipsometer base plate 50. The beam path consisting of the incident beam 14a and the emergent beam 14b passes through the slot 57 and strikes the sample surface at the cross. The three step motors 49 that adjust the height as well as the two angles between the ellipsometer system and sample surface as well as the ellipsometer base plate 50 are attached to the base plate 52.

Figure 4:
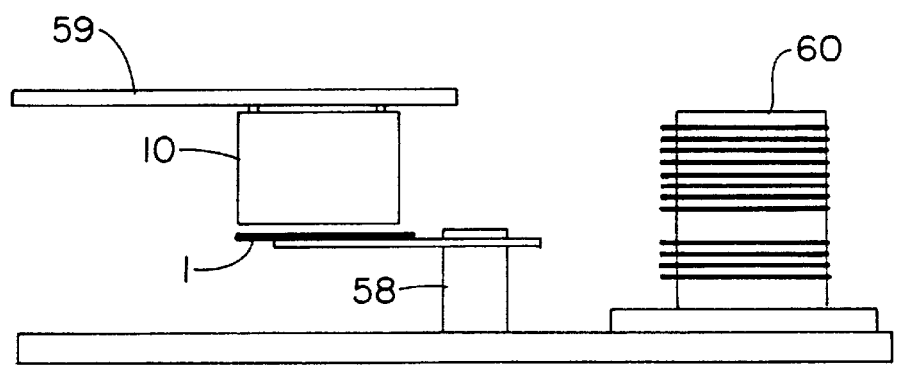
FIG. 4 shows a measuring head according to FIG. 3 in an application for measuring wafers.

FIG. 4 illustrates a possible embodiment that could be integrated in a production process of, for example, wafers. The samples 1 are located in a sample fixture 60. A robot 58 transports a sample 1 under the ellipsometer 10, which is attached to a carrier 59. The ellipsometer 10 adjusts itself automatically in relation to the sample surface and performs the measurement. At the end of the measurement, the robot returns the sample 1 to the sample fixture 60.

FIG. 3d) is a line drawing of the device shown in FIG. 3a.

What is claimed is:

1. A device for automatic relative adjustment of a sample located on a sample table, said device containing an ellipsometer for analyzing the sample surface, said device comprising:

the ellipsometer, said ellipsometer having a first light source;

a single sample position detection system, wherein said detection system has a second light source, wherein said detection system is independently adjustable in relation to said ellipsometer, and wherein said detection system can be locked electronically into position relative to said ellipsometer so that said ellipsometer and said detection system can be adjusted as one unit in relation to said sample, wherein said detection system can detect both the tilt of said sample, and distance of said sample from a coordinate source of the ellipsometer in two perpendicular axes; and an adjusting device, wherein said adjusting device can adjust the position of said ellipsometer, and wherein said adjusting device can adjust said sample table, and, wherein said adjusting device can adjust said electronically locked ellipsometer and said detection system.

2. A device according to claim 1, wherein said detection system comprises:

a light source;

optical elements, wherein said light source and said optical elements produce two beams of light which can be directed to the surface of said sample; and two position-sensitive detectors which capture light from said light source reflected from said sample surface, wherein one said position sensitive detector is provided for detecting the tilt of said sample, and one said position sensitive detector detects said sample distance.

3. A device according to one of the claim 1 or 2, wherein said adjusting device comprises at least one translation actuator and two pivot actuators.

4. A device according to one of the claims 1 to 3, further comprising a signal analysis unit that is linked with said adjusting device and connected to said ellipsometer.

5. A device according to one of the claims 1 to 4, wherein said adjusting device adjusts said electronically locked ellipsometer and said detection system.

6. A method for automatic relative adjustment of a sample positioned on a sample table in relation to an ellipsometer that analyses a sample surface, said method comprising the steps of:

calibrating said ellipsometer with a first sample utilizing symmetry of a detector signal of said ellipsometer, said ellipsometer having a first light source, adjusting a single sample position detection system that detects both sample distance of from a coordinate source of the ellipsometer and tilt of the sample in two perpendicular axes in relation to the ellipsometer, said detection system having a second light source, locking said detection system in a fixed position relative to said ellipsometer so that said detection system and said ellipsometer can be adjusted as one unit in relation to said sample, replacing said first sample with at least a second sample, and adjusting said at least a second sample with said locked detection system and said ellipsometer based on a signal of said detection system in relation to each other.

7. A method according to claim 6, further including the step of monitoring the symmetry of the ellipsometer signal continuously and readjusting said ellipsometer when a deviation from the symmetry is detected.

* * * * *